United States Patent [19]

Mäntymäki

[11] Patent Number: 4,818,289

[45] Date of Patent: Apr. 4, 1989

[54] METHOD FOR UTILIZING SLAG FROM METAL PRODUCTION

[75] Inventor: Tarmo K. Mäntymäki, Harjavalta, Finland

[73] Assignee: Outokumpu Oy, Helsinki, Finland

[21] Appl. No.: 63,751

[22] Filed: Jun. 22, 1987

Related U.S. Application Data

[63] Continuation of Ser. No. 804,376, Dec. 3, 1985, abandoned.

[30] Foreign Application Priority Data

Dec. 21, 1984 [FI] Finland .................................. 845114

[51] Int. Cl.$^4$ .................... C03C 13/06; C04B 5/06; C04B 14/46
[52] U.S. Cl. ..................... 106/117; 501/28; 501/36; 501/95; 501/155
[58] Field of Search ............ 501/28, 36, 95, 155; 106/117

[56] References Cited

U.S. PATENT DOCUMENTS

| | | | |
|---|---|---|---|
| 130,578 | 8/1872 | Hartman | 501/28 |
| 429,225 | 6/1890 | Bryan | 501/28 |
| 605,042 | 5/1898 | Doak | 501/36 |
| 4,047,968 | 9/1977 | zur Strassen et al. | 106/117 |
| 4,165,991 | 8/1979 | zur Strassen et al. | 106/117 |
| 4,174,961 | 11/1979 | Wolfs et al. | 106/117 |
| 4,363,878 | 12/1982 | Yamamoto et al. | 501/95 |

FOREIGN PATENT DOCUMENTS

| | | | |
|---|---|---|---|
| 2546530 | 11/1984 | France | 106/117 |
| 12091 | 4/1973 | Japan | 501/95 |
| 96546 | 5/1985 | Japan | 501/36 |
| 11184 | 6/1910 | United Kingdom | 106/117 |
| 2077251 | 12/1981 | United Kingdom | 106/117 |

*Primary Examiner*—William R. Dixon, Jr.
*Assistant Examiner*—Ann M. Knab
*Attorney, Agent, or Firm*—Brooks Haidt Haffner & Delahunty

[57] ABSTRACT

The present invention relates to a method for utilizing slag from metal production, particularly the silicate slag with a high iron oxide content resulting from copper or nickel proceses, in the production of heat-resistant, fire-resistant and/or alkali-resistant fibre material. According to the invention, the temperature dependence of the slag viscosity is changed by means of alloying the slag so that the relative proportion of the acidic components contained in the slag is increased.

5 Claims, 1 Drawing Sheet

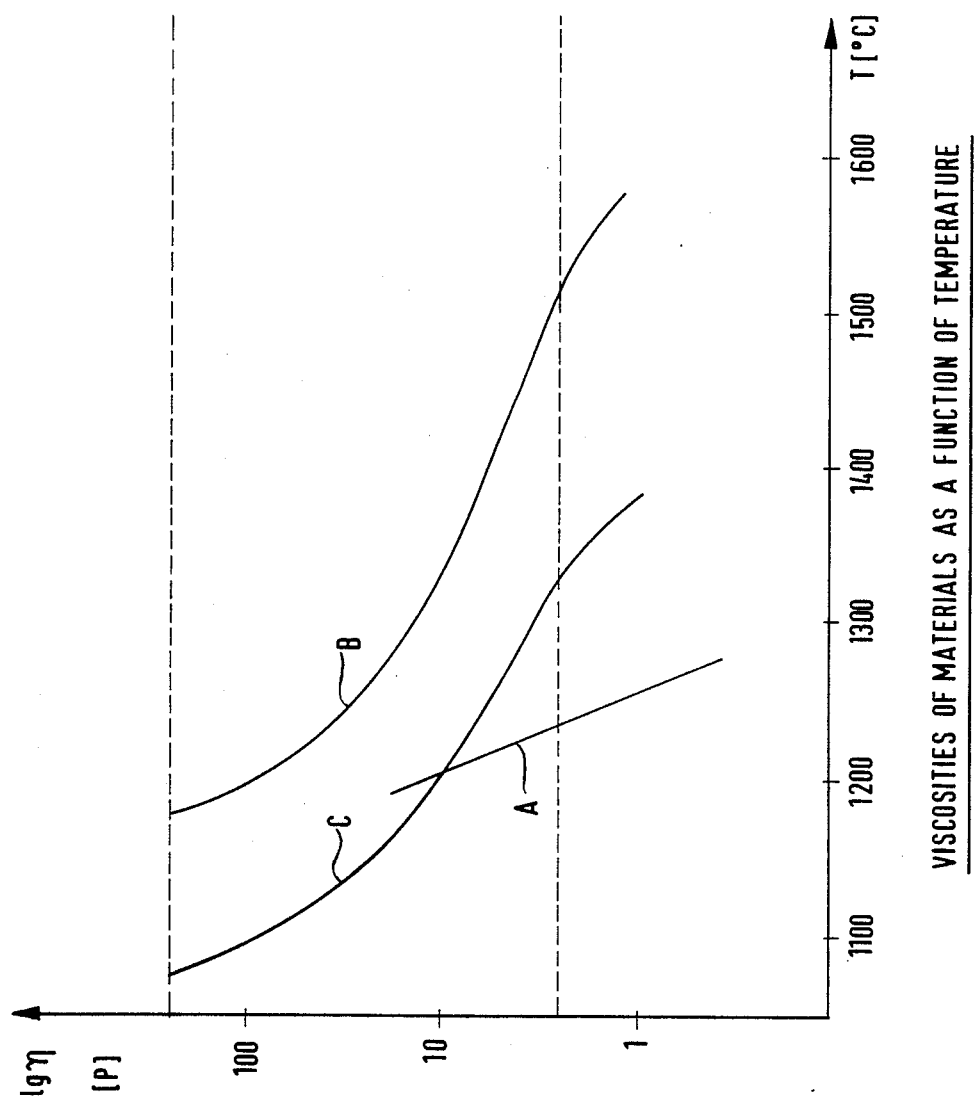

METHOD FOR UTILIZING SLAG FROM METAL PRODUCTION

This application is a continuation of application Ser. No. 804,376, filed Dec. 3, 1985, abandoned.

The present invention relates to a method for utilizing slag from metal production, particularly the silicate slag with a high iron oxide content resulting from copper or nickel processes, in the production of heat-resistant, fire-resistant and/or alkali-resistant fibre materials, such a mineral wool.

Mineral wools are manufactured of molten silicates by means of a quick cooling process, so that a glass-like structure is achieved. Apart from silicates, mineral wools contain for example calcium oxide, aluminium oxide and magnesium oxide.

Among the quality requirements set for mineral fibres - in addition to the requirements of the manufacturing process itself - are qualities connected to the practical use of mineral wool, for instance the length and diameter of the fibres, the thermal conductivity, fire resistance capacity, homogeneity and glass-like nature of the material, as well as its specific weight, chemical resistance and strength.

The glass-like nature of mineral wool is an important factor with respect to the final product. The formation of glass is echanced for instance by only a small difference in energy between the crystalline and molten states, a high energy of activation in the crystallization, i.e. high viscosity of the molten substance, and quick cooling. In addition to this, the formation of glass is affected by the acid-base ratio of the molten substance, so that the glass will be the more instabile, the higher its basicity. The viscosity of a silicate solution is mainly determined by the size of the anions contained therein. As a general principle it can be said that the larger the proportion of complex agents contained in the molten substance, the higher its viscosity. Agents increasing viscosity are for example silicon oxide, aluminium oxide, titanium oxide and chromium(III)oxide. Among alkaline oxides, iron oxide and manganese oxide are better flux agents than magnesium oxide. Furthermore, slags with a high magnesium content are less viscous than slags containing calcium.

In the production of mineral wool, surface tension also plays an important role in successful defibration, because it is necessary that the molten substance has a free access out of the furnace and the defibration machine. A practical guideline for the ratio between the viscosity and surface tension is defined or to be over 0.01, or else the molten flow will start to make droplets.

The manufactures of mineral wools have traditionally taken a negative attitude towards raw materials containing iron oxide. This has been due to the effects caused by the iron oxides in the production process. Iron oxides tend to be reduced within the cupola furnace owing to the strong temperature dependence of the slag viscosity, and consequently they accumulate on the furnace bottom and cause interruptions in the operation and damage to the centrifuge frames. However, small amounts of iron oxides are added to the raw materials if the fire-resistant capacities of the mineral wool should be improved. Moreover, it has been a common attitude that high iron oxide contents weaken the elasticity of the produced wool, which has generally resulted in a decreased covering capacity of the wool.

The object of the present invention is to eliminate some of the drawbacks of the prior art and to achieve an improved method for utilizing slag from metal production, particularly slags from copper and/or nickel processes so that the slag can be used as raw materials in mineral wool production. The essential novel features of the invention are apparent from the appended patent claims.

Slags resulting from copper or nickel production, which slags are usually fayalite ($2FeO.SiO_2$) -based silicate slags, have a high iron oxide content. Previously this iron oxide content has, as was explained above, been an obstruction for using these slags in the production of mineral wools. However, a recent observation according to the present invention has surprisingly shown that slags from metal production can be alloying be employed in manufacturing both fibre materials suited for high temperatures and strengthening wool materials suited for insulation or construction materials in the building industry. This is due to the fact that the alloying process makes the temperature dependence of the material viscosity change, and the temperature dependence of the viscosity curve determined as a function of the temperature is weakened within the temperature range employed in mineral wood production. Thus the process of manufacturing fibre-like wool materials can be easily controlled, and the final product will be essentially homogenous, with the desired composition.

According to the invention, various compounds are added to the slag from copper of nickel production so that the relative content of acidic components in the slag increases. Thus, according to the invention, the content of aluminium oxide $Al_2O_3$ and/or silicon oxide $SiO_2$ contained in the slag is increased so that the phase equilibriums of various slag compounds are taken into account. Consequently it is possible to achieve, as desired, either materials with an essentially high melting point and strong temperature and alkali resistance, which materials can be used instead of asbestos, or materials suited for relatively low temperatures and used instead of asbestos, for instance as heat insulation.

The slags suited for the method of the invention usually contain as their main components 25-40% by weight silicon oxide, 40-65% by weight iron oxide, 0-10% by weight calcium oxide, 0-10% by weight magnesium oxide and 0-15% by weight aluminium oxide. As was stated above, in the description of the prior art, the high iron oxide content of the said slags has so far prevented the slags from being used for instance in the production of mineral wool. Iron oxide, which in slags from copper and nickel production is mainly present as bound in silicate in the form FeO, behaves as an alkaline component when the slags are treated, whereas the silicate-forming silicon oxide is known as an acidic component. Thus, by adding silicon oxide and/or aluminium oxide, which is another oxide generally acting as an acidic component, into the slag, the iron oxide - silicon oxide ratio within the slag can be changed so that it becomes profitable with respect to the manufacturing of mineral wool. However, when observing the method of the invention, it has been found out that in order to achieve an advantageous defibration the iron oxide content must not decrease below 22% by weight in the raw material for mineral wool. Moreover it is pointed out that the iron oxide content in the raw material for mineral wool is profitably between 22-35% by weight. This is achieved by adding into the slag 15-35% by weight silicon oxide and/or 8–15% by weight aluminium oxide with respect to the slag weight.

Owing to the variations in the contents of the slags used in an advantageous application of the method of the present invention, it may also be necessary to add small amounts of other oxidic components into the material compound in order to achieve ideal properties for the final product. Particularly in the production of materials with a low difibration temperature, an addition of silicon oxide in some cases increases the defibration temperature, and other oxide components are required in order to compensate this increase. Possible components to be added are for instance calcium oxide, magnesium oxide and zinc oxide.

In the following the invention is explained in more detail with reference to the appended examples and the enclosed drawing, which drawing is a diagram illustrating the temperature dependence of the viscosities of the alloyed raw materials for mineral wools according to the examples, with respect to a non-alloyed slag from metal production.

According to the drawing, the curve A stands for the temperature dependence of the viscosity of non-alloyed slag from metal production. It is apparent from the diagram that the temperature dependence of curve A is very strong and therefore its defibration at a determined temperature is extremely difficult. The diagram also shows the advantageous viscosity range suited for defibration, which is 2.5–250 poises. By means of alloying such slags from metal production that are suited to be employed in the method of the present invention, an essential change towards advantageous defibration was achieved in the viscosity-temperature dependence of the alloyed raw material for mineral wool. This can be clearly seen in the viscosity-temperature dependence curves of the raw material compounds of the examples, which curves are illustrated in the appended drawing and show that their temperature dependence is essentially weaker than with slag from metal production. As for the examples, they also represent a preferred embodiment of the invention.

EXAMPLE 1

30% by weight silicon oxide was added to a slag containing 53.0% by weight iron oxide, 32.0% by weight silicon oxide, 8.9% by weight magnesium oxide, 2.8% by weight aluminium oxide and 1.3% by weight calcium oxide, and which had a melting temperature of 1200°–1250° C., whereafter the melting temperature of the compound was increased, and additional heat had to be introduced into the process in order to carry out the defibration. The defibration was carried out in the ideal defibration temperature 1500° C. determined on the basis of the temperature-viscosity curve (curve B in the drawing) defined for this raw material compound of the invention by aid of measuring operations, so that the resulting material had a good fire resistance up to about 1200° C..

EXAMPLE 2

The slag of example 1 was employed as initial material in the production of a material with a lower temperature resistance. In order to achieve this, the slag from nickel production plus silicon oxide and aluminium oxide were mixed in a molten compound which contained 75% by weight slag, 10% by weight aluminium oxide and 15% by weight silicon oxide. This compound was defibrated according to example 1 on the basis of the curve C of the diagram in the temperature 1200° C., so that the resulting material had a fire resistance up to 900°–1000° C.

I claim:

1. A method for utilizing slag with an iron oxide content of 40 to 65% by weight from metal production, to produce a product which is useful as raw material in the production of heat-resistant, fire-resistant and/or alkali resistant fibre materials, comprising changing the temperature dependence of the slag viscosity by means of alloying for increasing the relative proportion of acidic components contained in the slag, the iron oxide content of the treated slag being at least 22% by weight FeO, and the calcium oxide content of the slag being between 0–10% by weight.

2. The method of claim 1, characterized in that the iron oxide content of the slag is adjusted between 22–35% by weight FeO.

3. The method of claim 1 or 2, characterized in that the aluminium oxide and/or silicon oxide content in the slag is increased.

4. The method of claims 1 or 2, characterized in that 25–35% by weight silicon oxide is added into the slag.

5. A method for utilizing slag from metal production in the production of a product which is useful as raw material for making heat-resistant, fire-resistant and/or alkali resistant fibre materials, said slag containing from 25–40% by weight silicon oxide, 40–65% by weight iron oxide, 0–10% by weight calcium oxide, 0–10% by weight magnesium oxide and 0–15% by weight aluminium oxide, comprising adding into the slag 15–35% by weight silicon oxide and/or 8–15% by weight aluminium oxide with respect to the slag weight, such that the iron oxide content of the slag is adjusted to between 22–35% by weight FeO, whereby the temperature dependence of the slag viscosity is changed by means of alloying so that the relative proportion of acidic components contained in the slag is increased.

* * * * *

UNITED STATES PATENT AND TRADEMARK OFFICE
CERTIFICATE OF CORRECTION

PATENT NO. : 4,818,289
DATED : April 4, 1989
INVENTOR(S) : Tarmo K. Mantymaki

It is certified that error appears in the above-identified patent and that said Letters Patent is hereby corrected as shown below:

Column 1:

line 52: "defined or to be over" should read:
           --defined to be over--.

Column 2:

line 16: "can be alloying" should read:
           --can by alloying--.

Signed and Sealed this

Twenty-third Day of January, 1990

Attest:

JEFFREY M. SAMUELS

Attesting Officer      Acting Commissioner of Patents and Trademarks